O. YATES.
NON-PUNCTURABLE AND NON-COLLAPSIBLE PNEUMATIC INSIDE TIRE.
APPLICATION FILED MAR. 11, 1921.
1,401,507.
Patented Dec. 27, 1921.
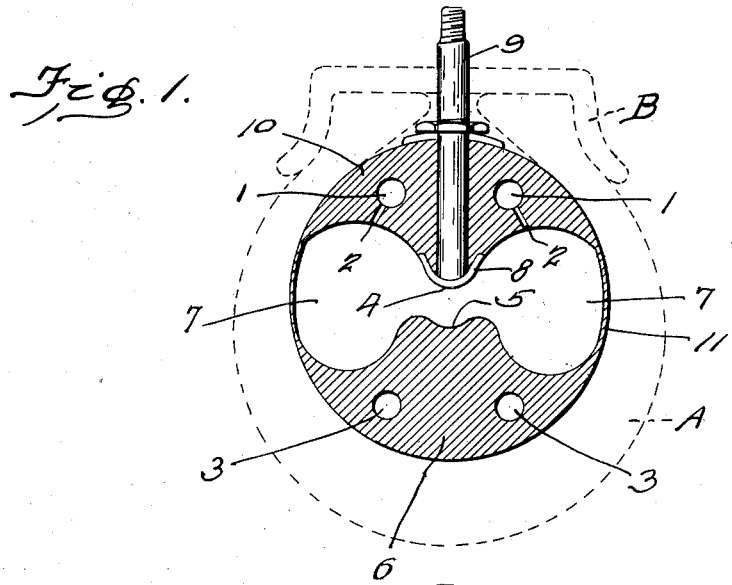
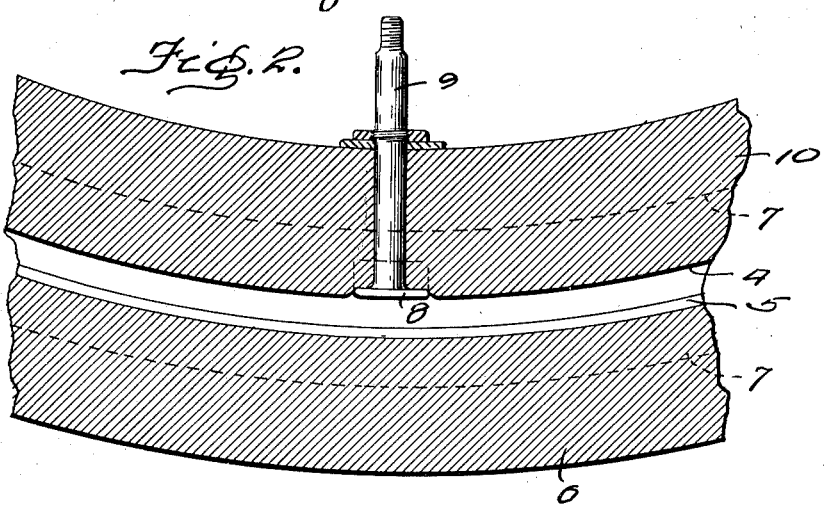
Witness
Inventor
Odaville Yates
By Jerry A Mathews
and Lester L Sargent
Attorney

UNITED STATES PATENT OFFICE.

ODAVILLE YATES, OF PORTLAND, OREGON.

NON-PUNCTURABLE AND NON-COLLAPSIBLE PNEUMATIC INSIDE TIRE.

1,401,507.   Specification of Letters Patent.   Patented Dec. 27, 1921.

Application filed March 11, 1921. Serial No. 451,522.

*To all whom it may concern:*

Be it known that I, ODAVILLE YATES, a citizen of the United States, residing at Portland, in the county of Multnomah and State of Oregon, have invented a new and useful Non-Puncturable and Non-Collapsible Pneumatic Inside Tire, of which the following is a specification.

The object of my invention is to provide a novel inside tire of the type named having a much longer life than the ordinary pneumatic inner tube. I attain the objects of my invention by the mechanism shown in the accompanying drawings, in which—

Figure 1 is a section transversely through my invention, the outer casing and rim being shown in dotted lines; and Fig. 2 is a longitudinal section through my invention on a median longitudinal line.

Like characters of reference indicate like parts in each of the views.

Referring to the accompanying drawings illustrating my invention, I provide a solid reinforcement tread 6, and an oppositely positioned top solid rubber reinforcement 10 extending around the tire. The reinforcement 6 is provided with a groove 5. I provide a suitable bottom locking plate 8 countersunk in the solid rubber reinforcement 10. A longitudinal rib 4 seats on groove 5 of the outer rubber reinforcement 6. I further provide suitable air passages or channels 3 in reinforcement 6, and similar air passages or channels 1 in reinforcement 10. I also provide openings 2, as shown in Fig. 1, connecting the air channels 1 with the large approximately 8-shaped air chamber 7, as shown in Fig. 1. The outer casing A and the rim B, surrounding this inside tire 11 are shown in dotted lines in Fig. 1, and are of conventional construction.

The main air space 7 in the inside tire 11 is inflated with air in the same manner as the ordinary tires now in use are inflated. The air channels 1 in reinforcement 10 are also inflated by reason of the provision of passages 2 from those channels 1 to the air space 7. The air passages or channels 3, and reinforcement 6, however, are not inflated from air space 7, but are simply sealed up when the tire or tube is finished, which gives them an air pressure of about 60 or 75 pounds. If these air passages 3 are punctured it will have no effect upon the main air space 7 which is substantially separated from the bottom outer surface of the tire by the heavy reinforcement 6. This reinforcement is of solid rubber and will prevent a puncture unless caused by a long nail or a blow-out; and in the latter case the longitudinal rib 4 and reinforcement 10 will seat on the longitudinal median groove 5 in reinforcement 6 which will prevent the inside tire from collapsing, since rib 4 and groove 5 are normally only one-half inch apart when the inside tire is fully inflated. This construction will also prevent the tire from being thrown from the wheel from collapse of the tire as may be the case with tires now in use when a puncture or blow-out occurs. In case of a puncture of this tire, it is possible to drive almost any distance for repairs without rim-cutting or any further damage to either the inside tire or outer casing.

What I claim is:

1. A non-puncturable and non-collapsible pneumatic inside tire comprising oppositely positioned heavy reinforcements, one of said reinforcements being disposed adjacent the tread of the other reinforcements along the inner portion of the tire, the tire having a substantially 8-shaped air space intervening between said reinforcements, the median longitudinal portions of said reinforcing means being normally spaced only a short distance apart, reinforcements adjacent the tread having independent air passages, said passages not being in communication with the central 8-shaped air spaces, whereby the puncture of one of the small air spaces will not deflate the tire.

2. In a tire of the class described, the combination of an inside tire having oppositely positioned heavy reinforcements, one of said reinforcements being disposed adjacent the tread portion of the inside tire, the tire having a substantially 8-shaped air space intervening between said reinforcements, the median longitudinal portions of said reinforcements being normally spaced only a short distance apart and shaped to seat one on the other, the reinforcement on the inner side of the tire having annular passages encircling the reinforcement, said passages being in communication at spaced intervals with the central main air spaces, whereby said inner air passages are inflated with the inflation of the main air space.

3. In a tire of the class described, the combination of a tire having oppositely disposed heavy reinforcements, one disposed along the tread and the other oppositely disposed along the inner side of the tire, the tread reinforcement having a median longitudinal groove, and the inner reinforcement having a median longitudinal rib shaped to seat on the aforementioned groove in case of deflation of the tire, said groove and said rib normally being spaced only slightly apart, air passages in the tread reinforcement, said air passages not being in communication with the central air space, and air passages in the inner reinforcement and openings connecting said last mentioned air passages with the main air space, substantially as and for the purposes described, whereby a non-collapsible and substantially non-puncturable tire is provided.

ODAVILLE YATES.